United States Patent
Sammour et al.

(10) Patent No.: US 6,311,067 B1
(45) Date of Patent: Oct. 30, 2001

(54) GRADUAL FREQUENCY PLAN REVISION METHODOLOGY

(75) Inventors: Mohammed Sammour, Montreal; Daniel Dufour, Blainville; Sylvain LaBonté, St-Bruno-de-Montarville, all of (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/476,409

(22) Filed: Dec. 30, 1999

(51) Int. Cl.$^7$ ............................................. H04Q 7/20
(52) U.S. Cl. ............................. 455/446; 455/447
(58) Field of Search ................................. 455/455, 452, 455/450, 447, 464, 446

(56) References Cited

U.S. PATENT DOCUMENTS

| | | | |
|---|---|---|---|
| 5,247,699 | * 9/1993 | Hartman | 455/33.1 |
| 5,974,324 | * 10/1999 | Henson | 455/447 |
| 6,151,510 | * 11/2000 | Zicker et al. | 455/553 |
| 6,212,384 | * 4/2001 | Almgren et al. | 455/446 |

FOREIGN PATENT DOCUMENTS

WO 98/35519   8/1998   (WO) .

OTHER PUBLICATIONS

Borndorfer, Ralf, et al., "The Orientation Model for Frequency Assignment Problems", Konrad–Zuse–Zentrum für Informationstechnik Berlin, Technical Report TR 98–01, Apr. 1998, pp. 1–21.
Borndorfer, Ralf, et al., "Stable Set and Other Techniques for Frequency Assignment Problems", Konrad–Zuse–Zentrum Für Informationstechnik Berlin, pp. 1–5 (date unknown).
Borndorfer, Ralf, et al., "Frequency Assignment in Cellular Phone Networks", Konrad–Zuse–Zentrum für Informationstechnik Berlin, Preprint SC 97–35, Jul., 1997, pp. 1–19.

* cited by examiner

Primary Examiner—Nguyen T. Vo
Assistant Examiner—N. Mehrpour
(74) Attorney, Agent, or Firm—Jenkens & Gilchrist

(57) ABSTRACT

Utilizing a sequential local search optimization algorithm, a determination is made of the cell/transceiver retunes needed to implement, given a current frequency plan, a better frequency plan for a certain cellular communications system. Each of the individual cell/transceiver retunes is evaluated to determine if it meets certain save criteria, and if so, is saved as an intermediate frequency plan in a sequence of saved intermediate frequency plans necessary to migrate from the current frequency plan to the determined near-optimal frequency plan. A sequential implementation of these intermediate frequency plan revisions is then made to gradually reach, in a known and controlled manner, the better frequency plan.

23 Claims, 2 Drawing Sheets

GRADUAL FREQUENCY PLAN REVISION METHODOLOGY

BACKGROUND OF THE INVENTION

1. Technical Field of the Invention

The present invention relates to cellular telephone systems and, in particular, to a method for effectuating revisions to a frequency plan that is used for assigning frequencies to transceivers in cells of a cellular telephone system.

2. Description of Related Art

Cellular telephone systems divide a large service area into a number of smaller discrete geographical areas called "cells" each typically ranging in size from about one-half to about twenty kilometers in diameter. Each cell is at least contiguous and/or overlapping with multiple adjacent cells to provide substantially continuous coverage throughout the service area. A base station including a plurality of transceivers capable of operating independently on different assigned radio frequencies is provided for each of the cells. Via the transceivers, the base stations engage in simultaneous communications with plural mobile stations operating within the area of the associated cell. The base stations further communicate via data links and voice trunks with a central control station, commonly referred to as a mobile switching center, which functions to selectively connect telephone calls to the mobile stations through the base stations and, in general, control operation of the system.

Each cell is assigned use of a predetermined set (group) of frequencies from the cellular frequency band for use in providing its control and voice/data (traffic) channels. The assignment is typically made in accordance with a certain frequency plan. The frequencies used for the control and traffic channels assigned to a given cell are preferably spaced apart from each other across the frequency spectrum of the cellular frequency band. This serves to minimize the instances and adverse affects of adjacent channel interference.

Because only a limited number of frequencies are available in the cellular frequency band, the same (for example, group of) frequencies that are assigned by the frequency plan to one cell are also assigned to (i.e., reused by) other cells in distant parts of the service area. Typically, adjacent (i.e., neighbor) cells are not assigned to use the same frequency by the frequency plan. Furthermore, the power levels of the signal transmissions on any given frequency are limited in strength so as to limit propagation beyond the cell area. The foregoing precautions serve to reduce instances of co-channel interference caused by reuse of that same frequency in a distant cell. It is further noted that careful power level and distance assignment also assists in reducing instances of adjacent channel interference.

In spite of the precautions taken by service providers in the frequency plan assignment for a frequency reuse cellular telephone system and in the regulation of system operation, it is known that instances of co-channel interference do occur. This interference may be affected by a number of factors including: terrain irregularities; radio propagation changes; fading; multipath propagation; reflection; existence of human and natural obstructions; the number of available transceivers per cell; and variations in demand. This interference often adversely affects system operation by, for example, degrading voice quality on the traffic channels or interfering with the transmission and reception of control signals on the control channels. Service providers accordingly monitor on a cell by cell basis for instances of adjacent channel and co-channel interference on the assigned frequencies, as well as for instances of relatively low interference on other frequencies, and in response thereto identify potential revisions that could by made to the frequency plan to provide better service by minimizing interference.

A number of algorithms and methodologies are known in the art for either 1) determining from scratch an initial frequency plan for a cellular system (referred to in the art as "starting heuristics") or 2) determining, when starting from a current frequency plan, a better frequency plan for a cellular system (referred to in the art as "improvement heuristics"). See, R. Borndorfer, et al., "Frequency Assignment in Cellular Phone Networks", Konrad-Zuse-Zentrum fur Informationstechnik Berlin, Preprint SC 97-35 (July 1997), Annals of Operations Research 76 (1998), pages 73–93. These and other prior art frequency plan assignment and revision methodologies, while ultimately succeeding in most cases in identifying a better or perhaps near-optimum final frequency plan, do suffer from a number of drawbacks. First, none of these methodologies provide any suggestion to the cellular system operator on how to most efficiently get from the current frequency plan to the final frequency plan in a gradual manner. This is a concern as the proposed revision ignores the operator's operation and maintenance issues relating to being able to effectuate (from a time, equipment, scheduling and manpower perspective) all the retunes necessary to reach the final plan. This is also a concern because during the course of actually performing such a retune to reach the final frequency plan, system performance may be unacceptably degraded if not completed in a timely manner. Second, in situations where the methodology allows the operator to put a cap on the number of retunes allowed to be made in reaching the determined final frequency plan (thus addressing the foregoing operation and maintenance concerns), a concern exists that this new plan may not necessary be the optimum plan. In this regard, the system operator has no a priori knowledge of what would be the optimum plan, and thus has no idea without actually deploying the retune and checking results whether the latest deployed plan is either satisfactory or optimum or even whether a better plan exists and thus the methodology should be run again.

SUMMARY OF THE INVENTION

A sequential optimization algorithm is executed to compute the frequency assignments (i.e., cell/transceiver retunes) necessary to be made in order to implement, given a current frequency plan, a better frequency plan for a certain cellular communications system. In the context of executing the sequential algorithm, each individual cell/transceiver retune (i.e., frequency assignment vector) is evaluated to determine if it meets certain store criteria. If so, that individual cell/transceiver retune is stored as an intermediate frequency plan in a sequence of a plurality of stored intermediate frequency plans. These stored intermediate frequency plan revisions are then sequentially implemented over time to gradually reach, in a known and controlled manner, the better frequency plan. Identification of the intermediate frequency plans takes into account frequency assignment rule violations, operator logistical concerns, and quality of service preferences.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1A:
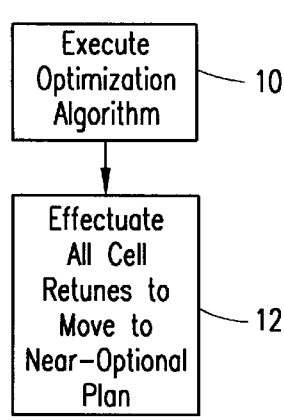
FIGS. 1A and 1B are flow diagrams illustrating two prior art frequency plan revision methodologies.
Figure 1B:
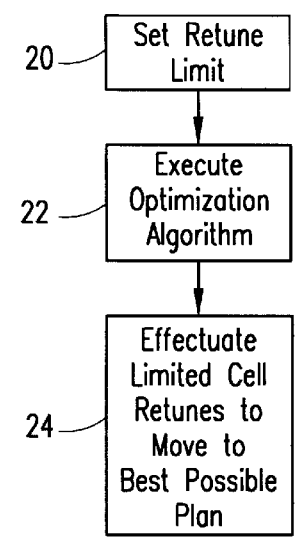
Figure 2A:
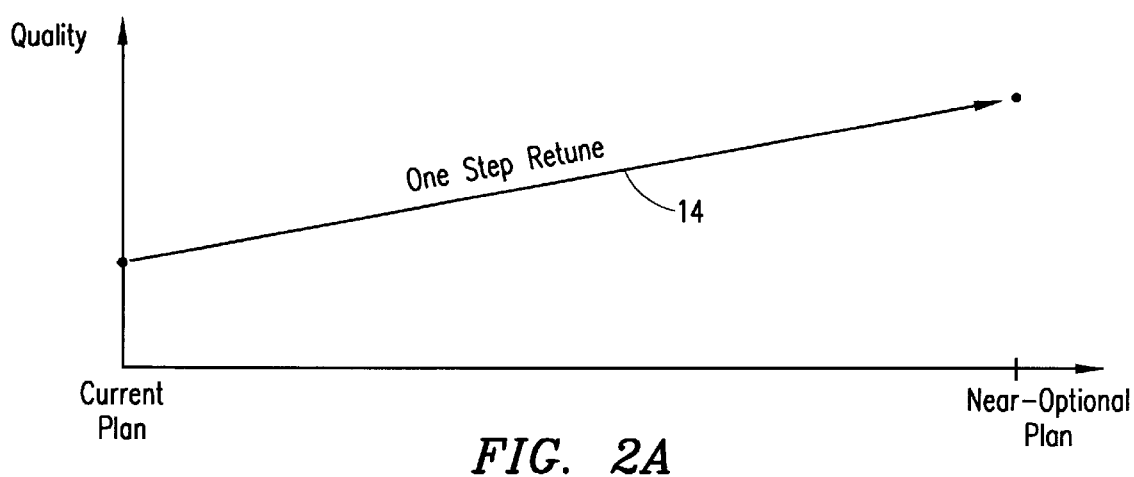
FIGS. 2A and 2B are graphs illustrating the cell retune processes resulting from the implementation of the frequency plan revision methodologies of FIGS. 1A and 1B, respectively.

Reference is now made to FIGS. 1A and 1B wherein there are shown flow diagrams illustrating two prior art frequency plan revision methodologies. In accordance with a first methodology (see, FIG. 1A), an optimization algorithm is executed in step 10 to compute the frequency assignments (i.e., cell retunes given by a final frequency assignment vector) necessary to implement, given a current frequency plan, a near-optimal frequency plan for a certain cellular communications system. In step 12, the determined plurality of cell retunes designated by the final vector are effectuated to move from the current frequency plan to the determined near-optimal frequency plan in what is in essence a one step process. This one step cell retune process is graphically illustrated in FIG. 2A through the implementation of final vector 14. Certain drawbacks are know to exist with respect to this prior art frequency plan revision methodology. For example, due to cellular system operator time and manpower limitations, it may be impossible to effectuate all the required cell retunes for the vector 14 in a substantially simultaneous manner (such as over the course of a single night). As a result, the cell retunes that are successfully made at one time in partially completing the frequency plan revision may unacceptably (and temporarily) leave the system in a state of degraded radio quality performance.

Figure 2B:
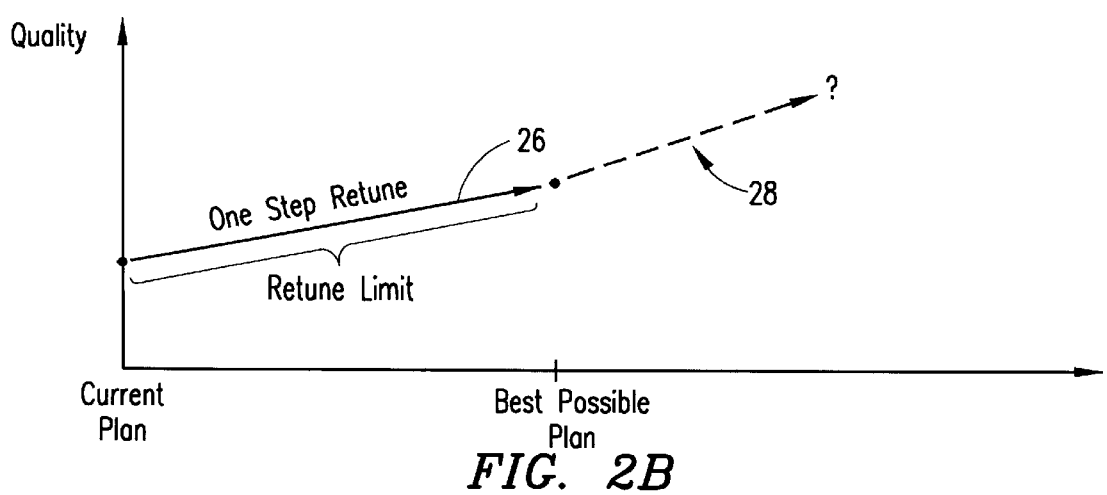

In accordance with a second methodology (see, FIG. 1B), the operator, cognizant of its time, equipment, scheduling and manpower limitations, sets a limit in step 20 on the maximum number of cell retunes that are permitted. An optimization algorithm is then executed in step 22, subject to the operator specified cell retune constraints (in number of retunes), to compute the frequency assignments (i.e., cell retunes given by a final frequency assignment vector) necessary to implement, given a current frequency plan and the retune constraints, a best possible frequency plan for a certain cellular communications system. In step 24, the determined plurality of cell retunes are effectuated to move from the current frequency plan to the determined best possible frequency plan (given the noted restraints in number of permitted cell retunes) in what is also in essence a one step process. This one step cell retune process is graphically illustrated in FIG. 2B through the implementation of a final vector 26. Certain drawbacks are know to exist with respect to this prior art frequency plan revision methodology. For example, the determined best possible frequency plan may not necessarily comprise the near-optimal frequency plan (compare to FIG. 2A). This leaves the service operator guessing (see, generally at vector 28 in FIG. 2B) as to whether the determined best possible frequency plan is either satisfactory or optimum or even whether a better plan exists and thus the algorithm should be executed again.

Figure 3:
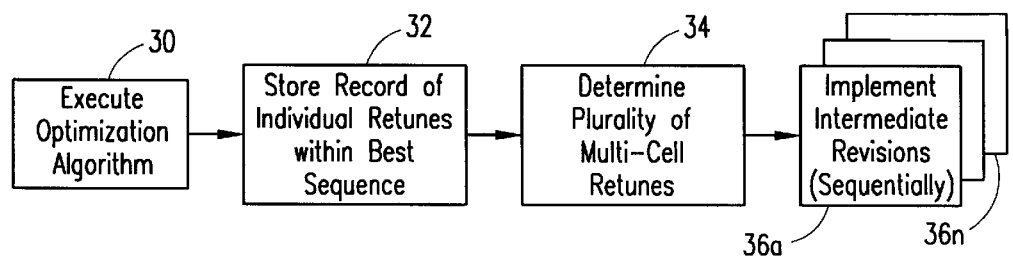
FIG. 3 is a flow diagram illustrating a frequency plan revision methodology in accordance with one embodiment of the present invention.
Figure 4:
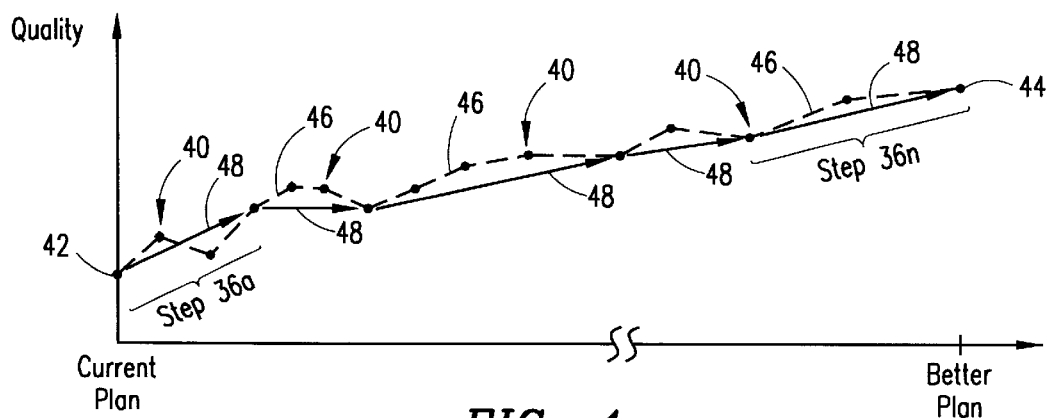
FIG. 4 is a graph illustrating the cell retune process resulting from the implementation of the frequency plan revision methodology of the present invention.

Reference is now made to FIG. 3 wherein there is shown a flow diagram illustrating a frequency plan revision methodology in accordance with the present invention. A sequential optimization algorithm is executed in step 30 to compute the frequency assignments (i.e., cell/transceiver retunes 40 in FIG. 4) necessary to implement, given a current frequency plan 42, a better (for example, near-optimal) frequency plan 44 for a certain cellular communications system. In step 32, a record is stored concerning the order of each individual cell/transceiver retune determined by the optimization algorithm thus providing a best sequence 46 of individual cell/transceiver retunes 40 to be made in order to migrate from the current frequency plan 42 to the determined better frequency plan 44. This best sequence 46 of migration is then manipulated in step 34, taking into account system operator limitations and preferences, to determine an ordered plurality of n multi-cell (or multi-transceiver) retunes 48, each such multi-cell/transceiver retune effectuating an intermediate (or sub-optimal) revision to the frequency plan. These intermediate revisions are then sequentially implemented in multiple steps 36a–36n to over time gradually reach, in a known and controlled manner, the near-optimal frequency plan as graphically illustrated in FIG. 4. The point of the process then is to give the system operator not only information on the final better frequency plan, but also information on the gradual (measured and achievable) steps to be taken in reaching that plan.

Figure 5:
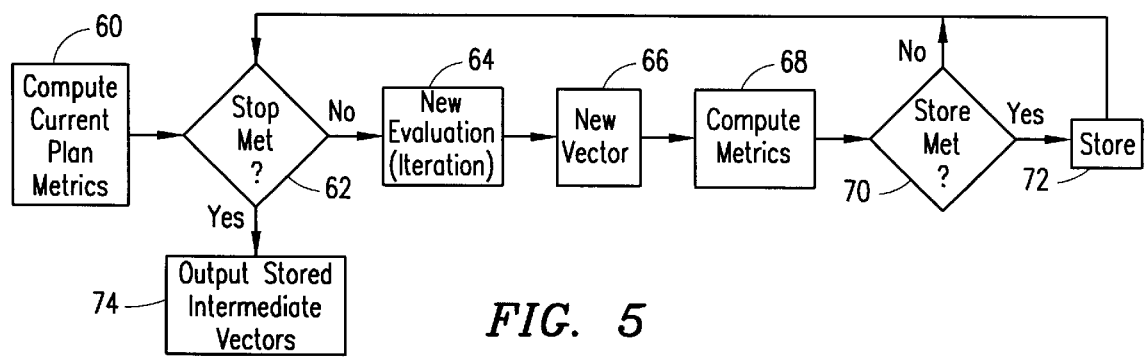
FIG. 5 is a flow diagram illustrating a frequency plan revision methodology in accordance with another embodiment of the present invention.

Reference is now made to FIG. 5 wherein there is shown a flow diagram for an alternative embodiment of the present invention. The process of the present invention may be further understood with respect to the following terminology definitions and description.

Iteration: since the optimization algorithm is sequential, it progresses in steps or iterations that form a sequence, a fact that is exploited to provide a gradual migration of the frequency plan.

Assignment Vector: This is a function of each cell (or each transceiver therein) representing the frequency group (or individual frequency) assigned to that cell (or transceiver)

Quality Metrics: This refers to one or more metrics that estimate the radio network quality for an associated frequency assignment vector. For example, the metrics can include the interference level averaged over all cells in the network, the probability of outage (dropped calls) in the network, the carrier-to-interference ratio, and the like. These quality metrics are typically monitored as an average of the metric over every cell (or transceiver) in the network, but sometimes can also extend to monitor the result of metric in individual cells (or transceivers), the rationale being that some assignment vectors may produce acceptable quality metrics when looking at the network average, but they produce poor quality in some individual cells (or transceivers) that are important.

Violation metrics: Although a sequential optimization algorithm produces intermediate frequency assignment vectors, the deployment of these vectors may not be feasible due to some "violations" that would result therefrom. For example, some potential assignment vectors may violate rules associated with the handoff process, while others may violate some base station hardware rules (such as combiner spacing), while other assignment vectors may be tolerated. Normally, the final, better, frequency assignment vector will not produce any critical violations (although it may produce some non-critical ones that are otherwise acceptable). Still further, the intermediate frequency plans (i.e., frequency assignment vectors) should be picked in a way that does not produce any critical violation with few if any non-critical violations.

Decision Criteria: There are several criteria implemented during the execution of the process, 1) stopping criteria—this refers to the decision to stop execution of the sequential optimization algorithm and use the last determined frequency assignment vector as the better (final, or near optimal) frequency plan revision, 2) progress criteria—this refers to the decision to proceed on to the next iteration, and 3) store criteria—this refers to the decision to store all or some of the intermediate frequency assignment vectors (intermediate frequency plan revisions) in the order their sequential determination. The stopping decision criteria can vary depending on the optimization algorithm, and thus stop when certain quality or violation metrics are achieved, or stop after some determined number of iterations corresponding to the number of cells (or transceivers) in the system. The progress decision criteria relates to the selection of which one of the plurality of unevaluated cells (or transceivers) is going to be the subject of examination in the next iteration. The store decision criteria evaluate operator logistical concerns and/or limitations such as scheduling and operations and maintenance issues as well as quality or violation metrics concerns in deciding which of the sequence of frequency assignment vectors is to be recognized as an intermediate frequency plan assignment.

Given the foregoing terminology definitions, the alternative process of the present invention proceeds as follows: start from a current frequency assignment vector (i.e., a current frequency assignment plan); compute the quality and violations metrics for this vector (step 60); and, until the stop decision criteria have been satisfied (step 62), then loop as follows: move to the next iteration and identify a cell (or transceiver) for evaluation (step 64); modify the frequency assignment of that cell (or transceiver) by determining a new frequency assignment vector (step 66) utilizing the sequential optimization algorithm; compute the quality and violations metrics for that new frequency assignment vector (step 68) ; and store the assignment vector (step 72) as an intermediate frequency assignment plan if the store decision criteria are satisfied (step 70). Once the stop criteria are met (step 62), the stored intermediate frequency assignment plans (i.e., the intermediate assignment vectors) are output (step 74) for sequential implementation in order to move the frequency plan for the system in a gradual manner toward the better frequency plan.

Reference is now once again made to FIG. 4. Each step 66 determined new vector (dotted lines) provides one of sequence of individual cell retunes 40. These individual retunes are not stored, however, unless the store criteria are met in step 70 (this is also illustrated by the dotted lines). Stored retunes 48 reflect the passing through of several iterations (i.e., they are multi-cell/transceiver in nature) before satisfaction of the store criteria, with each such retune representing one step or intermediate frequency plan revision (see solid arrows) in moving in a gradual and controlled manner from the current plan 42 to the better (near-optimal) plan 44.

The sequential optimization algorithm executed within the processes of FIGS. 3 and 5 preferably comprises one implementing a sequential local search technique. One benefit of such an algorithm is that the optimization operation considers one cell at a time in searching for the best frequency (or group of frequencies) that should be used by that cell to provide best performance (e.g., minimize interference). Once this frequency (or group of frequencies) is found, the algorithm moves on (i.e., sequentially goes) to another cell (or transceiver). The process of determining a best frequency (or group of frequencies) is repeated for each cell/transceiver until all the cells/transceivers in the system have been examined and considered. At this point, the algorithm may report on the sum total frequency assignments (i.e., cell retunes) necessary to implement, given a current frequency plan, a better frequency plan for that system. Record may be kept of each iterative repeat, and the process step 32 stores the order of each sequential individual cell retune determined by the optimization algorithm thus providing a best sequence of individual cell retunes needed to be made in order to migrate from the current frequency plan to the determined better frequency plan. Alternatively, record may be stored of just the desired intermediate frequency plan revisions as in step 72. Utilization of an algorithm having a sequential local search technique as is preferred in the context of the present invention makes it much easier to track and record the individual cell retunes.

In one embodiment of the present invention, the sequential optimization algorithm utilized in FIGS. 3 and 5 comprises an algorithm commonly known as "DSATUR with Costs" (see, R. Borndorfer, et al., "Frequency Assignment in Cellular Phone Networks", Konrad-Zuse-Zentrum fur Informationstechnik Berlin, Preprint SC 97–35 (July 1997), Annals of Operations Research 76 (1998), pages 73–93, sect. 4.3; D. Brelaz, "New Methods to Color the Vertices of a Graph", Communication of the ACM 22, 4 (April 1979), pages 169–174; and D. Costa, "On the Use of Some Known Methods for T-Colorings of Graphs", Annals of Operations Research 41 (1993), pages 343–358, the disclosures of which are hereby incorporated by reference). As the DSATUR with Costs algorithm is commonly implemented as a starting heuristic, and frequency plan revisions normally proceed from one established plan to another (i.e., not from scratch), the algorithm has been adjusted in the context of the present invention to implement an improvement heuristic by modifying the initialization part of the disclosed cost (v) (f) matrix to take into account the effect of the current frequency plan. This is accomplished in accordance with the following loop: for every cell v in the network, find all cells that are currently using frequency f; add up the values of the performance metric of interest (for example, interference) that are stored in the cell relations matrix between those other cells and cell v; and store the sum as cost (v) (f). The DSATUR with Costs algorithm is then implemented as disclosed by R. Borndorfer, et al., except that (a) a modified Delta (v) (f) matrix is utilized where the delta adds the contribution of the interference caused by the new assignment and also removes the contribution of the old assignment (because we assume we are starting from an initial frequency assignment rather than from scratch), and (b) the algorithm determined individual cell retunes needed to migrate from the current frequency plan to the determined near-optimal frequency plan are noted and saved in addition to reporting the determined final near-optimal frequency plan.

In another embodiment of the present invention, the sequential optimization algorithm utilized in FIGS. 3 and 5 comprises an algorithm commonly known as "Iterated 1-OPT" (see, R. Borndorfer, et al., "Frequency Assignment in Cellular Phone Networks", Konrad-Zuse-Zentrum fur Informationstechnik Berlin, Preprint SC 97-35 (July 1997), Annals of Operations Research 76 (1998), pages 73–93, sect. 4.4). The Iterated 1-OPT algorithm is implemented as disclosed by R. Borndorfer, et al., except that the algorithm determined individual cell retunes needed to be made in order to migrate from the current frequency plan to the determined better frequency plan are noted and saved in addition to reporting the determined final better frequency plan.

As mentioned above, certain system operator limitations and preferences are taken into account in step 34 and step 70. The operator limitation factors taken into account relate to the logistics (for example, time, manpower, physical equipment/resources, scheduling, and the like) for effectuating retunes. Thus, if an operator has limited manpower or physical resources to effectuate the needed retunes on a given night, this is taken into account in determining not only the ordered plurality of n multi-cell retunes but also the number of individual cell retunes within each of the n steps (i.e., the identification of the intermediate frequency plans), as well as the scheduling of those retunes in view of the resource limitations. The preference factors taken into account in the manipulation process relate to service quality concerns. Thus, if an operator desires to maintain a certain quality of service level as the migration of the frequency plan progresses towards the determined better plan, the determined intermediate frequency plan revisions are determined such that any dips in quality due to the making of an individual cell retune are masked by the collection of multiple cell retunes together to select each intermediate (sub-optimal) frequency plan to be effectuated at each retune step. In another implementation, the manipulation selects intermediate frequency plan revisions such that each intermediate frequency plan revision will provide a better quality of service within the system than its immediately preceding intermediate frequency plan revision. These operator preferences may further relate to considering whether the retune would violate any frequency assignment rules (either critical or non-critical) associated with, for example, the handoff process or hardware limitations.

Some important properties of a sequential, local search optimization algorithm that are exploited in the method of FIGS. 3 and 5 are: a) the algorithm progresses in steps (iterations) whereby a new cell (or possibly a new transceiver) is considered for a frequency assignment change; and b) two consecutive frequency assignment vectors differ from each other only to a slight degree (i.e., they are "neighbors" of each other).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for determining a gradual frequency plan revision process, comprising the steps of:
    executing a sequential optimization algorithm to compute a best sequence of individual retunes needed to be made in order to implement, given a current frequency plan, a better frequency plan for a certain cellular communications system;
    manipulating the best sequence of individual retunes to determine an ordered plurality of plural retunes, each plural retune comprising several of the individual retunes and effectuating an intermediate frequency plan revision; and
    sequentially implementing these intermediate frequency plan revisions to gradually reach the better frequency plan.

2. The method as in claim 1 wherein the sequential optimization algorithm implements a sequential local search technique.

3. The method as in claim 2 wherein the sequential optimization algorithm comprises a DSATUR with Costs algorithm modified as an improvement heuristic.

4. The method as in claim 2 wherein the sequential optimization algorithm comprises an Iterated 1-OPT algorithm.

5. The method as in claim 1 wherein the step of manipulating further comprises the step of taking in account during the manipulation certain cellular communications system operator logistical retuning limitations to determine the intermediate frequency plan revisions.

6. The method as in claim 5 wherein the operator logistical retuning limitations include at least one of a time limitation, a manpower limitation, a physical equipment limitation, and a scheduling limitation.

7. The method as in claim 1 wherein the step of manipulating further comprises the step of taking in account during the manipulation certain cellular communications system operator service quality preferences to determine the intermediate frequency plan revisions.

8. The method as in claim 7 wherein the operator service quality preferences include having each intermediate frequency plan revision provide a better system quality than its immediately preceding intermediate frequency plan revision.

9. The method as in claim 1 wherein each individual retune relates to a cell retune.

10. The method as in claim 1 wherein each individual retune relates to a transceiver retune.

11. The method as in claim 1 wherein the step of manipulating further comprises the step of taking in account during the manipulation certain operator frequency assignment rule violations to determine the intermediate frequency plan revisions.

12. The method as in claim 11 wherein the operator frequency assignment rule violations include handoff process frequency assignment concerns and hardware frequency assignment limitations.

13. A method for determining a gradual frequency plan revision process, comprising the steps of:
    executing a sequential optimization algorithm to iteratively compute a sequence of frequency assignment vectors for moving a cellular communications system from a current frequency plan to a better frequency plan;
    evaluating for each iteratively computed frequency assignment vector whether certain vector store criteria are met;
    if so, storing that iteratively computed frequency assignment vector as one intermediate frequency assignment vector within a sequence of a plurality of stored intermediate frequency assignment vectors; and
    sequentially implementing the stored sequence of intermediate frequency assignment vectors as a sequence of frequency plan retunes within the cellular communications system to gradually reach the better frequency plan.

14. The method as in claim 13 wherein the sequential optimization algorithm comprises a DSATUR with Costs algorithm modified as an improvement heuristic.

15. The method as in claim 13 wherein the sequential optimization algorithm comprises an Iterated 1-OPT algorithm.

16. The method as in claim 13 wherein the certain vector store criteria include certain cellular communications system operator logistical retuning limitations and the step of evaluating comprises the step of checking that performing a retune based on that iteratively computed frequency assignment vector would not conflict with the operator logistical returning limitations.

17. The method as in claim 16 wherein the operator logistical returning limitations include at least one of a time limitation, a manpower limitation, a physical equipment limitation, and a scheduling limitation.

18. The method as in claim 13 wherein the certain vector store criteria include certain cellular communications system operator service quality preferences and the step of evaluating comprises the step of checking that performing a retune based on that iteratively computed frequency assignment would meet or exceed the operator service quality preferences.

19. The method as in claim 18 wherein the operator service quality preferences include having each intermediate frequency assignment vector provide a frequency plan with a better system quality than its immediately preceding intermediate frequency assignment vector.

20. The method as in claim 13 wherein the certain vector store criteria include certain operator frequency assignment rule violations and the step of evaluating comprises the step of checking that performing a retune based on that iteratively computed frequency assignment vector would not result in an operator frequency assignment rule violation.

21. The method as in claim 20 wherein the operator frequency assignment rule violations include handoff process frequency assignment concerns and hardware frequency assignment limitations.

22. The method as in claim 13 wherein each iteratively computed frequency assignment vector specifies a retune for a plurality of transceivers within an individual cell.

23. The method as in claim 13 wherein each iteratively computed frequency assignment vector specifies a retune for an individual transceiver within a cell.

* * * * *

UNITED STATES PATENT AND TRADEMARK OFFICE
CERTIFICATE OF CORRECTION

PATENT NO. : 6,311,067 B1
DATED : October 30, 2001
INVENTOR(S) : Sammour et al.

It is certified that error appears in the above-identified patent and that said Letters Patent is hereby corrected as shown below:

Column 8,
Lines 10, 13 and 66, replace "turning" with -- tuning --

Column 9,
Lines 3 and 5, replace "turning" with -- tuning --

Signed and Sealed this

Ninth Day of April, 2002

Attest:

JAMES E. ROGAN
*Attesting Officer*     *Director of the United States Patent and Trademark Office*